(12) United States Patent
Porterfield

(10) Patent No.: US 6,480,951 B2
(45) Date of Patent: *Nov. 12, 2002

(54) SYSTEM FOR ISSUING DEVICE REQUESTS BY PROXY

(75) Inventor: A. Kent Porterfield, New Brighton, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/917,977

(22) Filed: Jul. 30, 2001

(65) Prior Publication Data

US 2001/0042183 A1 Nov. 15, 2001

Related U.S. Application Data

(63) Continuation of application No. 09/008,899, filed on Jan. 20, 1998, now Pat. No. 6,301,645.

(51) Int. Cl.[7] .............................................. G06F 12/00
(52) U.S. Cl. ........................... 711/206; 711/203; 710/4; 710/38
(58) Field of Search ............................... 711/206, 203, 711/207; 710/4, 38; 712/26

(56) References Cited

U.S. PATENT DOCUMENTS

| 5,920,699 A | * | 7/1999 | Bare ........................... 709/225 |
| 6,067,581 A | * | 5/2000 | Porterfield ..................... 710/4 |
| 6,098,172 A | * | 8/2000 | Coss et al. ................... 713/201 |

* cited by examiner

Primary Examiner—Matthew Kim
Assistant Examiner—Matthew D. Anderson
(74) Attorney, Agent, or Firm—Dorsey & Whitney LLP

(57) ABSTRACT

A system for issuing device requests by proxy in a system using distributed control through a multi-port switch. A device issues a request to a central switch indicating the original requester as the source rather than itself. This passes responsibility for the control of the actual data transfer back to the original requester, and the device is no longer involved.

9 Claims, 6 Drawing Sheets

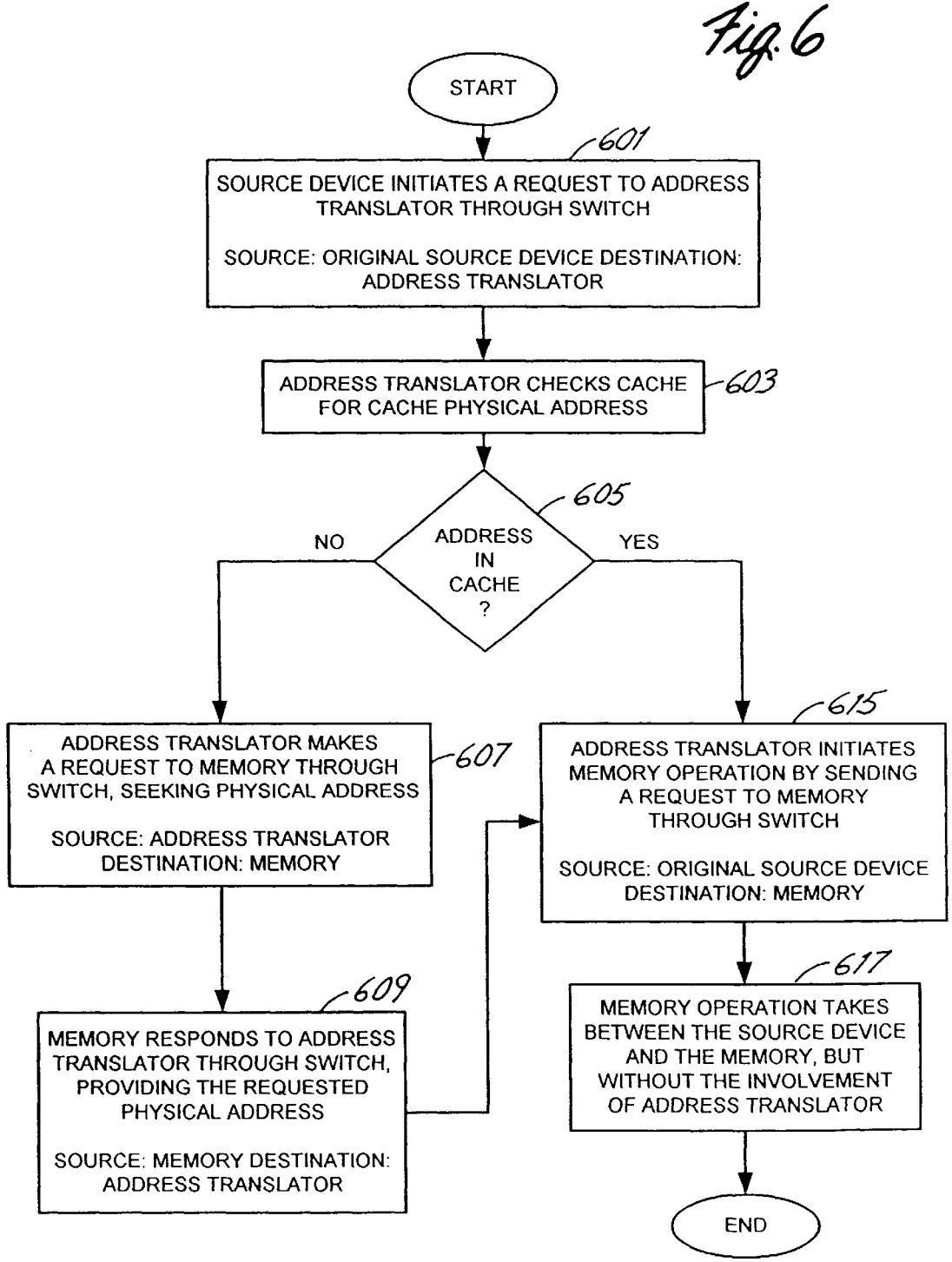

SYSTEM FOR ISSUING DEVICE REQUESTS BY PROXY

RELATED APPLICATION

This application is a continuation application of U.S. patent application, Ser. No. 09/008,899, filed Jan. 20, 1998 now U.S. Pat. No. 6,301,645.

FIELD OF THE INVENTION

The present invention relates generally to techniques for issuing device requests in a computer system. More particularly, the present invention relates to a system in which a device may issue a device request on behalf of another device.

BACKGROUND OF THE INVENTION

Connectivity between disparate devices within a computer system or between modules in an integrated circuit or ASIC is often accomplished through at least one central switch that is connected to devices on different busses throughout the system. A central switch allows transactions to be routed internally, so that each device is able to access other modules connected to the central switch, without requiring additional ports or unnecessary logic specific to the target resource or target device. For example, a memory control module in a system controller having a central switch may be accessed through this central switch from the interface for the system processor, from a number of busses within the computer system, or perhaps from other devices or modules within the system controller. In order to communicate with this memory control module, other devices connected to the switch only need to communicate with the central switch, which translates requests from the form appropriate for one device to a form suitable for another.

When a request is issued by one device to another, the device that is the source of the request includes two request two tags within the request. These two tags identify the source device for the request and the destination device for the request. When a device issues a request to another device, the source or requesting device issues a request to the central switch, identifying itself as the source, and the target device as the destination. The switch then analyzes the tags, performs any necessary translation, and then communicates the request to the target or destination device as identified by the destination tag. Thereafter, the requested operation is performed.

Often the conventional procedure of issuing device requests in such an environment works efficiently. However, in some situations, inefficiencies or redundancies result when the requesting device identifies itself to the switch as the source. These inefficiencies result in increased loads on the central switch, and also in unnecessary demands on some of the devices or other resources within the system. Thus, there exists a need for an efficient system and method for more efficiently issuing requests between devices in a computer system, while also maintaining compatibility with applicable bus standards or other standards, and while not unnecessarily increasing the complexity of devices within the system.

SUMMARY OF THE INVENTION

The present invention relates to techniques for issuing device requests by proxy. In one embodiment of the invention, the invention relates to a computer comprising: (a) a bus; (b) a system controller connected to the bus so that it can access devices on the bus, wherein the system controller comprises a switch that receives requests identifying a source device and a destination device, wherein the switch routes each request to a destination device identified by the request; and (c) a proxy device that is attached to the switch, and that sends a request to the switch identifying a destination device and a source device, wherein the source device is a device that is different from the proxy device.

In another embodiment of the present invention, the present invention relates to a computer comprising: (a) a processor connected to a host bus; (b) system memory connected to a memory bus; (c) a device connected to an expansion bus; and (d) a system controller connected to the host bus, the memory bus, and the expansion bus so that it can access devices on the host bus, the memory bus, and the expansion bus. The system controller comprises: (i) a switch that receives requests identifying a source device and a destination device, wherein the switch routes the requests to the identified destination device, and (ii) a proxy device that is attached to the system controller and that sends a request to the switch identifying a destination device and a source device, wherein the source device is a device that is different than the proxy device.

Additional embodiments and features, and the nature of the present invention may be more clearly understood by reference to the following detailed description of the invention, the appended claims, and to the several drawings herein.

BRIEF DESCRIPTION OF THE DRAWINGS

FIG. 6 is a flow chart illustrating the operation of a computer system having a central system controller and an address translator that includes translation look-aside buffers.

DETAILED DESCRIPTION OF THE INVENTION

Figure 1:
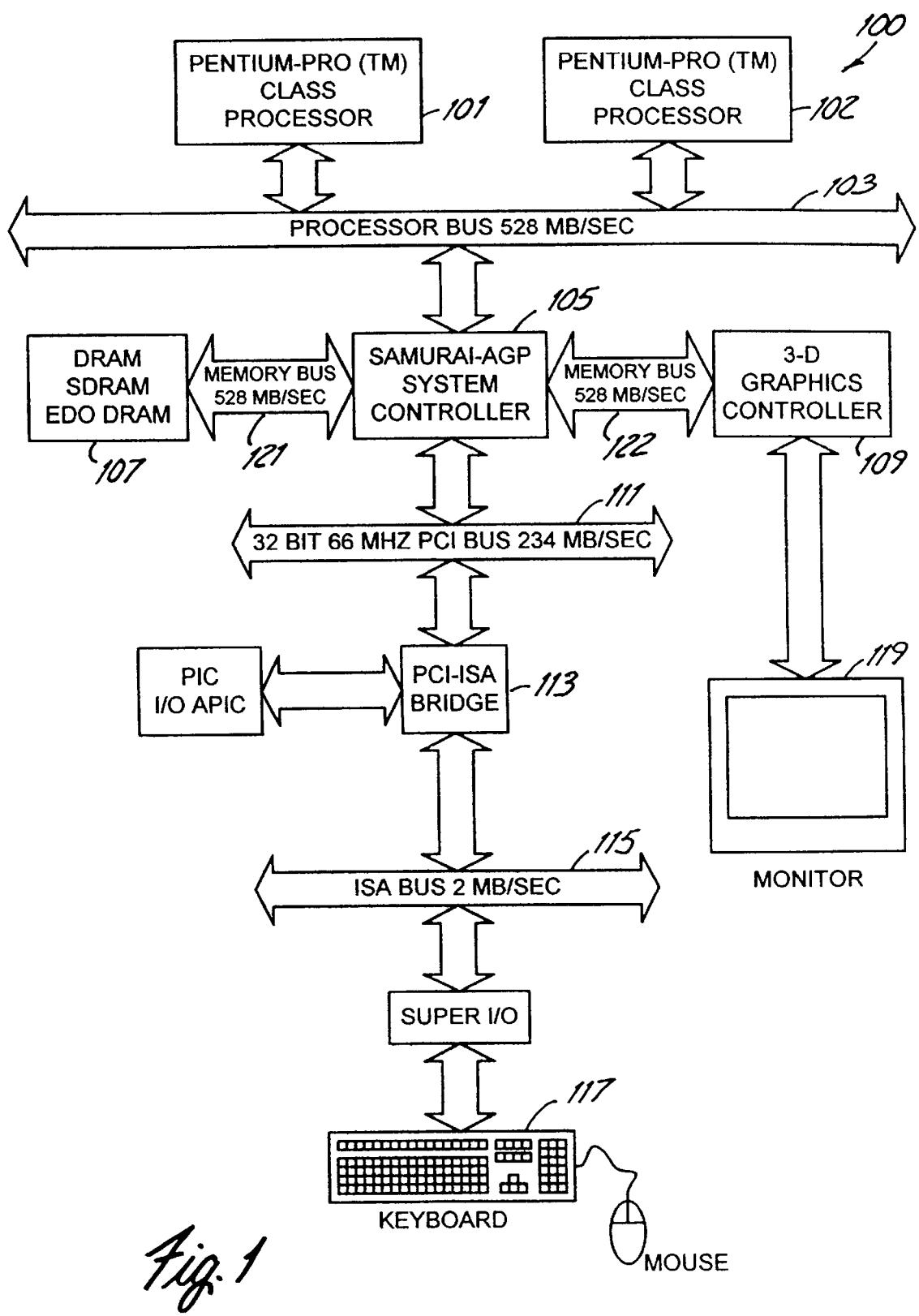
FIG. 1 is a block diagram of a computer system including a central system controller connected to a processor or host bus, system memory, and a graphics controller.

FIG. 1 is a block diagram of a multi-processor computer system 100 having processors 101 and 102 attached to a processor or host bus 103. The computer system 100 has a system controller 105 attached to the processors 101 and 102 through the processor or host bus 103. The system controller 105 is also attached to the system memory 107 through a memory bus 121, and also to a graphics controller 109 through a video or graphics bus 122, such as an Accelerated Graphics Port bus. The graphics controller 109 is used in connection with the monitor 119.

The system controller 105 also is attached to one or more expansion busses, such as the PCI bus 111. As shown in FIG. 1, additional busses can also be included within the system in a. hierarchical fashion. For example, the ISA bus 115 is connected to the PCI bus through bridge logic 113.

Figure 2:
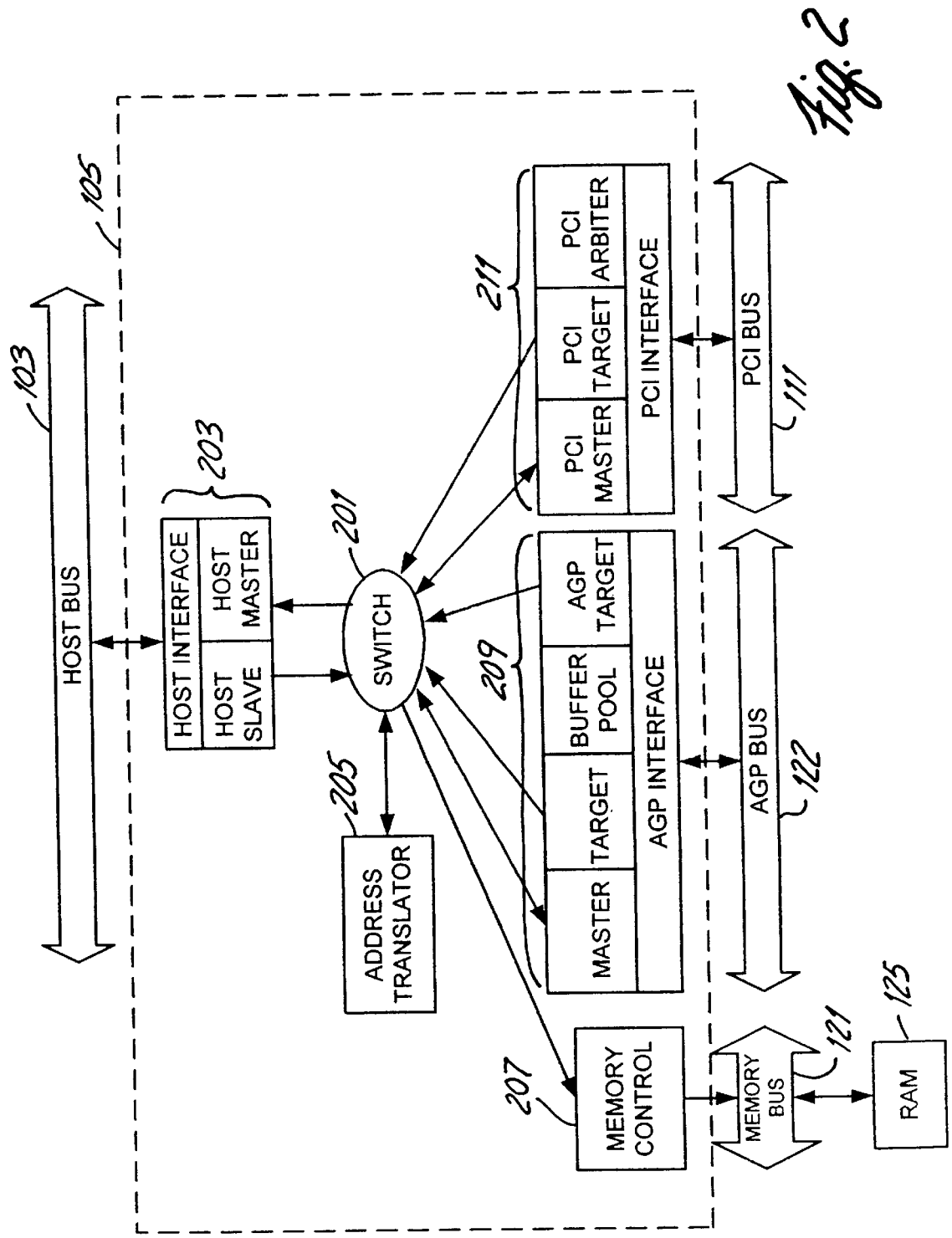
FIG. 2 is a block diagram of the system controller of FIG. 1, including connections to busses outside the system controller.

FIG. 2 is a more detailed block diagram of the system controller 105 of FIG. 1. The system controller 105 includes a central switch 201 which is connected to each of the devices or modules shown in the system controller 105. The host module 203 sits between the host bus 103 and the central switch 201 and handles communication between the bus 103 and the switch 201. Similarly, the switch 201 is also connected to the memory bus 121 through the memory control module 207 within the system controller 105. The system memory 125 is shown on the memory bus 121. The switch 201 is also connected to the AGP bus 122 through the AGP module 209, and the PCI bus 111 and the switch 201 are connected by the PCI module 211 within the system controller 105.

Figure 3:
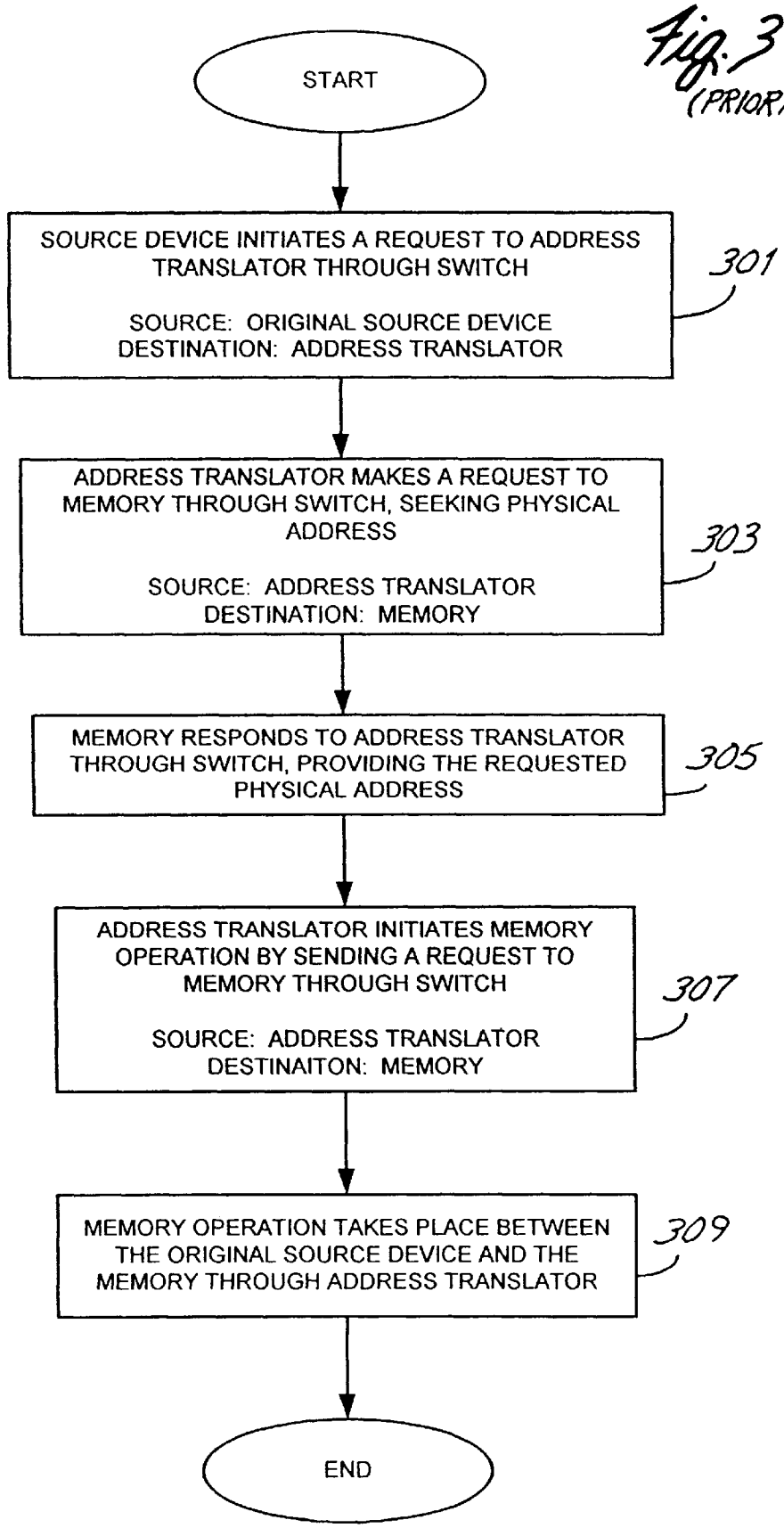
FIG. 3 is flow chart of the operation of a computer system having a central system controller.

FIG. 3 is a flow chart illustrating the conventional operation of a system controller in a system such as that shown in FIGS. 1 and 2. In the example hereinafter described, the Address Translator 205 is responsible for translating a virtual address to a physical address. This is often necessary when a device or module initiates an operation that is directed to the graphics aperture, or virtual memory that is designated for use by the graphics subsystem. The virtual address that may be used by the requesting device is translated into a physical address before the operation is be carried out. The translation of the virtual address to the physical address is typically done with reference to a remapping table. Normally, this table is referred to as the Graphic Address Remapping Table, and it may be stored in system memory 125. In some implementations, when a request or memory operation is directed to the graphics aperture, the Address Translator 205 will look up information in the remapping table, and then supply the targeted physical address. The physical address is used to carry out the memory operation.

At 301, a device (hereinafter referred to as the "original source device") initiates a request to the Address Translator 205 within the system controller 105. This original source device could be the AGP module 209 (specifically, e.g., the AGP target within the AGP module 209). The original source device could also be the PCI module 211, the host module 203, or the original source device could also be another device within the system. The original source device initiates the request to the Address Translator 205 through the switch 201 in FIG. 2. The switch 201 does any necessary translation of the information or request it receives from the original source device, and then passes the request or information to the Address Translator 205. As described earlier, the original source device includes in its request two tags identifying the source and destination of the request. The switch 201 uses these tags to decode which devices are communicating. As shown at 301 in FIG. 3, the source is identified by such tags as the original source device, and the destination is identified as the Address Translator 205.

At 303, the Address Translator 205 makes a request to memory through the switch 201, seeking a physical address that corresponds to a virtual address received from the original source device. Normally, in this request the Address Translator 205 is retrieving information from a remapping table stored in memory 125, which will allow it to perform the translation. Once it has the necessary information from the remapping table in main memory 125, it performs the translation from the virtual address to the physical address. The Address Translator is identified as the source of the request at 303, and the memory control module 207 is identified as the destination of the request.

At 305, the memory responds to the Address Translator 205, and provides the requested information, allowing translation of the virtual address into a physical address. The memory control module 207 responds to the Address Translator through the switch 201, providing it with the requested data. (In some embodiments, the memory 125 itself may effectively perform the translation so that the information retrieved from the memory 125 is the physical address, thereby making any meaningful further translation by the Address Translator 205 unnecessary.)

At 307, once the Address Translator 205 has the physical address, it initiates the memory operation requested by the original source device by sending a request to memory 125 through the switch. The Address Translator 205 is identified as the source of the request, and the memory control module 207 is identified as the destination. Thereafter, the memory operation takes place between the original source device and the memory control module 207 through the Address Translator 205.

Figure 4:
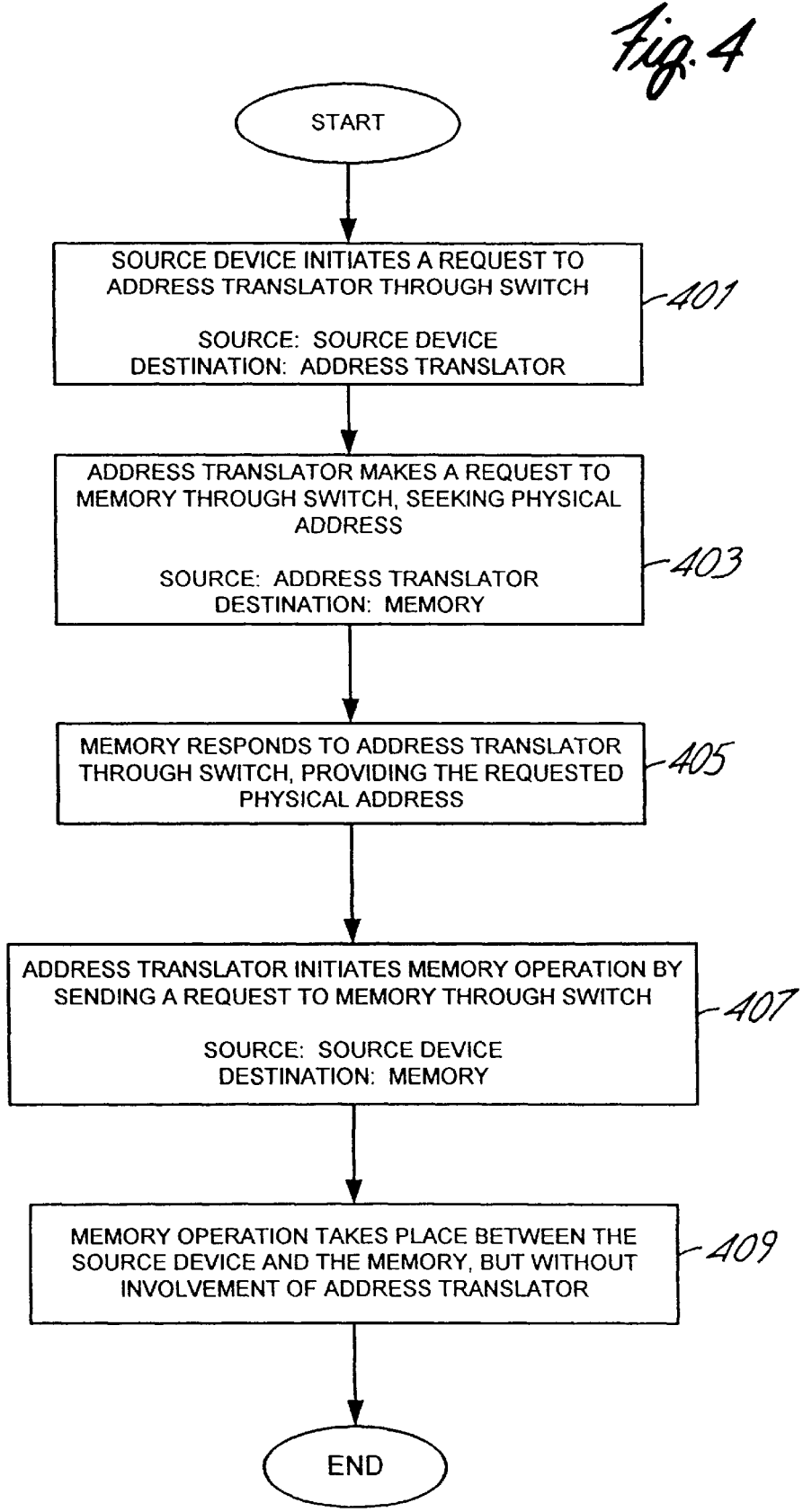
FIG. 4 is a flow chart illustrating the operation of a computer system having a central system controller in which a device request is issued by a device on behalf of another device.

FIG. 4 is flow chart illustrating an embodiment of the present invention wherein the system controller operates differently than is shown in FIG. 3. Specifically, the Address Translator 205 issues a device request on behalf of the original source device. At 401, an original source device initiates a request to the Address Translator 205 through the switch 201 in FIG. 2. The switch 201 does any necessary translation of the information or request it receives from the original source device, and then passes the request or information to the Address Translator 205. As shown at 401 in FIG. 4, the source is identified as the original source device, and the destination is identified as the Address Translator 205.

At 403, the Address Translator 205 makes a request to memory through the switch, seeking a physical address that corresponds to a virtual address received from the original source device, and identifying the Address Translator 205 as the source of the request, and the memory control module 207 as the destination of the request. At 405, the memory responds to the Address Translator 205, and provides the requested physical address or provides information that will enable a translation of the virtual address into the desired physical address. The memory control module 207 responds to the Address Translator 205 through the switch 201, providing it with the requested data.

At 407, the Address Translator 205 initiates the memory operation by sending a request to the memory control module 207 through the switch 201. However, unlike the process illustrated in FIG. 3, the original source device, rather than the Address Translator 205, is identified as the source of the request. In other words, the Address Translator 205 issues a request to the memory control module 207 on behalf of the original source device. The memory control module 207 is identified as the destination of the request. With the procedure of FIG. 4, control of the actual data transfer between the original source device and the memory control module 207 is passed seamlessly from the Address Translator 205 back to the original source device. Thereafter, the memory operation takes place between the original source device and the memory control module 207 without the involvement of the Address Translator 205, whereas in FIG. 3, the Address Translator 205 was involved in the memory operation. Thus, in FIG. 4, the Address Translator 205 issues a request by proxy, and then passes on control responsibility to the original source device. This allows the Address Translator 205 to remove itself from further involvement in the operation, and thereby allows it to perform other tasks.

Figure 5:
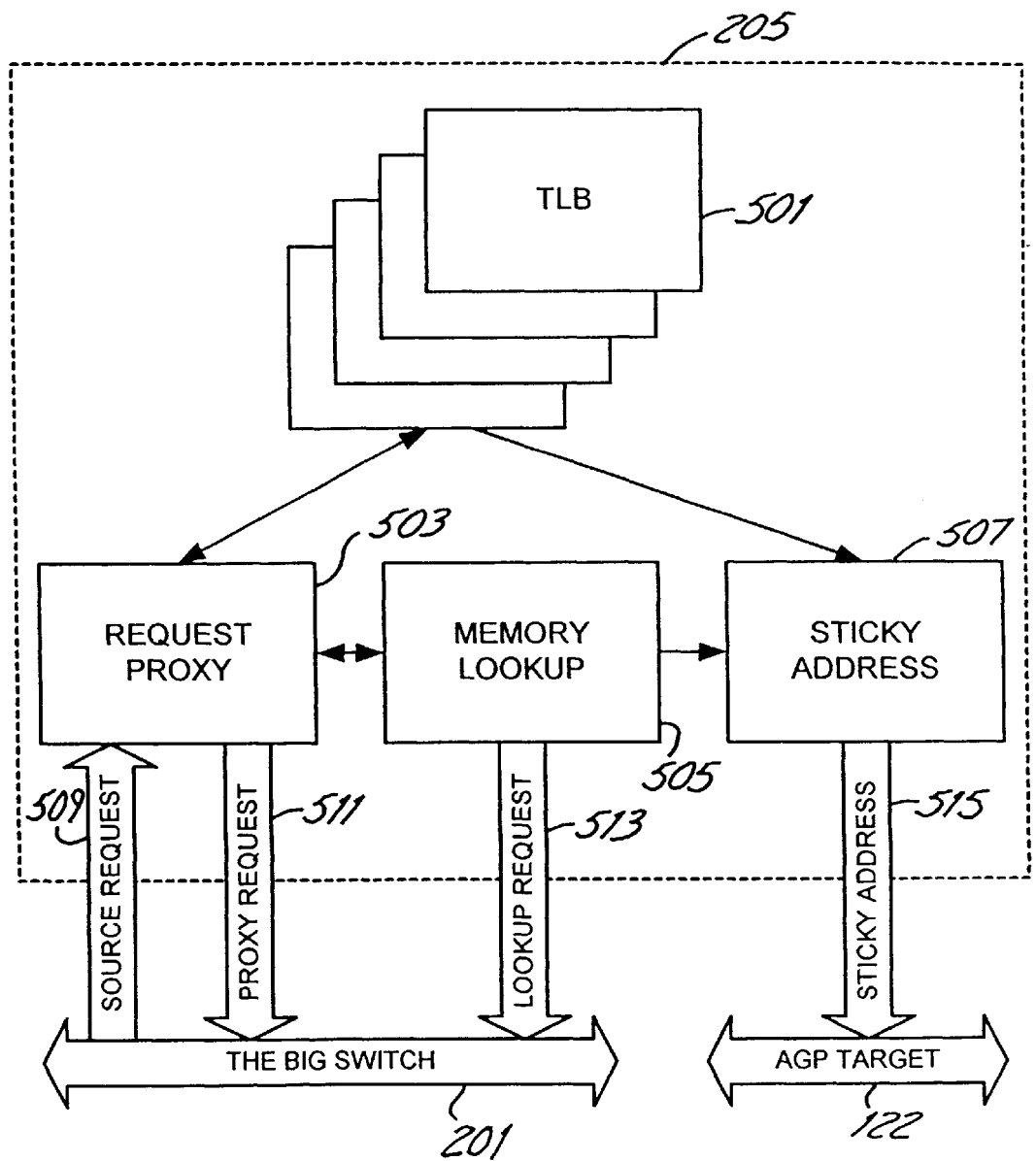
FIG. 5 is a block diagram of the address translator module having translation look-aside buffers.

FIG. 5 is a block diagram of the Address Translator 205 module described in connection with FIG. 2. In the embodiment shown, the Address Translator 205 includes one or more translation look-aside buffers (TLBs) 501 that are used for caching address information that has been previously retrieved from the remapping table in main memory. The Address Translator 205 also includes a request proxy module 503, a memory look-up module 505, and a sticky address module 507. The sticky address module 507 includes logic that enables data from consecutive addresses to be bursted over the AGP bus 201.

FIG. 6 is a flow chart illustrating the operation of the Address Translator 205 module in an embodiment of the present invention where translation look-aside buffers are used for caching virtual/physical address information. At step 601 in FIG. 6, an original source device initiates a request to the Address Translator 205 through the switch 201. In this request, the virtual address(es) involved in the operation are communicated to the Address Translator 205. The Address Translator 205 then accesses its cache at 603 in FIG. 6, seeking the physical address corresponding to the virtual address. In the embodiment of FIG. 5, the cache constitutes one or more translation look-aside buffers 501.

At 603, the Address Translator checks the translation look-aside buffers 501 to determine whether the physical address corresponding to the virtual address has been cached in the buffers 501. If at 605 the translation look-aside buffers do not have the corresponding physical address, the physical address is retrieved from memory at 607 and 609 in FIG. 6.

However, if it finds the corresponding physical address at 605, the Address Translator 205 does not need to access the remapping table in main memory 125. Instead, at 615, the Address Translator 205 retrieves the desired address from the cache, and then initiates the memory operation on behalf of the original source device by sending a request to the memory control module 207 through the switch 201. As shown at 615, this request identifies the original source device as the source, and the memory control module 207 as the destination. Control of the actual data transfer between the original source device and the memory control module 207 is passed seamlessly from the Address Translator 205 back to the original source device. Thereafter, the memory operation takes place at 617 between the original source device and the memory control module 207 without the involvement of the Address Translator 205.

The present invention is described herein in terms of an AGP- or PCI-based computer system, but it should be understood that the techniques and procedures disclosed herein can be applicable to other systems and architectures. Not all embodiments of the present invention are limited to an implementation based on the Accelerated Graphics Port an/or Peripheral Component Interconnect architecture. Further, although the present invention has been described principally in terms of a system controller interacting with other devices and modules within a computer system, the present invention is applicable to other contexts and environments, and is not necessarily limited to the particular environment(s) disclosed herein.

Although the present invention has been described in terms of certain embodiments, various changes and modifications, even if not shown or specifically described herein, are deemed to lie within the spirit and scope of the invention and the appended claims.

What is claimed is:

1. A system controller coupled to a memory, comprising:
   a switch to receive a transaction request that includes a source identifier for identifying a source device and a destination identifier for identifying a destination device, and to route the transaction request to the destination device identified by the destination identifier; and
   a translator, in communication with the switch, to translate the transaction request, to issue a proxy request to the memory on behalf of the source device, and to pass on control of a transaction, which is between the source device and the memory, from the translator to the source device thereby freeing the translator from further involvement in the transaction.

2. The system controller of claim 1, wherein the translator comprises a request proxy module, the request proxy module issues the proxy request to the memory.

3. The system controller of claim 1, wherein the translator comprises a memory look-up module and a sticky address module.

4. A method of controlling a transaction between a source device and a destination device in a computer system having a switch, an address translator coupled to the switch, and a memory in communication with the switch, comprising the steps of:
   initiating a transaction request by the source device to the address translator through the switch;
   making an address request by the address translator to the memory through the switch;
   providing a response to the address request from the memory to the address translator through the switch;
   initiating a transaction by the address translator using the response on behalf of the source device; and
   issuing a proxy request by the address translator to pass on control of the transaction, which is between the source device and the memory, from the address translator to the source device thereby freeing the address translator from further involvement in the transaction.

5. A controller, comprising:
   a switch to receive a transaction request that includes a source identifier for identifying a source device and a destination identifier for identifying a destination device, and to route the transaction request to the destination device identified by the destination identifier; and
   a first device, in communication with the switch, to process the transaction request, to issue a proxy request to a second device on behalf of the source device, and to pass on control of a transaction, which is between the source device and the second device, from the first device to the source device thereby freeing the first device from further involvement in the transaction.

6. The controller of claim 5, wherein the first device is an address translator, and the second device is a memory.

7. The controller of claim 6, wherein the transaction includes a memory operation.

8. The controller of claim 6, wherein the address translator comprises a request proxy module, the request proxy module issues the proxy request to the memory.

9. The controller of claim 6, wherein the address translator comprises a memory look-up module and a sticky address module.

* * * * *